US00RE42485E

(19) United States
(12) Reissued Patent
Fields

(10) Patent Number: US RE42,485 E
(45) Date of Reissued Patent: Jun. 28, 2011

(54) CAN END

(75) Inventor: Brian Fields, Lemont, IL (US)

(73) Assignee: Crown Packaging Technology, Inc., Alsip, IL (US)

() Term: 14 Years**

(21) Appl. No.: 29/289,429

(22) Filed: Jul. 19, 2007

Related U.S. Patent Documents

Reissue of:
(64) Patent No.: Des. 507,485
Issued: Jul. 19, 2005
Appl. No.: 29/185,692
Filed: Jul. 1, 2003

U.S. Applications:
(63) Continuation of application No. 29/149,028, filed on Oct. 1, 2001, now Pat. No. Des. 476,889, which is a continuation of application No. 29/135,401, filed on Jan. 12, 2001, now Pat. No. Des. 448,666.

(51) LOC (9) Cl. ..... 09-07
(52) U.S. Cl. ..... D9/438
(58) Field of Classification Search ..... D9/434, D9/438; 220/269–273
See application file for complete search history.

(56) References Cited

U.S. PATENT DOCUMENTS

| | | | | | |
|---|---|---|---|---|---|
| D218,961 | S | * | 10/1970 | Kennedy | D9/438 |
| D243,833 | S | * | 3/1977 | Markert | D9/438 |
| 4,084,721 | A | | 4/1978 | Perry | 220/269 |
| 4,217,843 | A | | 8/1980 | Kraska | 113/121 |
| 4,465,204 | A | | 8/1984 | Kaminski et al. | 220/269 |
| 4,716,755 | A | | 1/1988 | Bulso, Jr. et al. | 72/349 |
| D382,481 | S | | 8/1997 | McEldowney | D9/438 |
| D385,192 | S | | 10/1997 | Hurst et al. | D9/438 |
| D387,666 | S | | 12/1997 | Wise | D9/438 |
| D387,987 | S | | 12/1997 | Neiner | D9/438 |
| 5,711,448 | A | | 1/1998 | Clarke, III | 220/269 |
| 5,715,964 | A | | 2/1998 | Turner et al. | 220/269 |
| D396,635 | S | | 8/1998 | McEldowney | D9/438 |
| D397,296 | S | | 8/1998 | McEldowney et al. | D9/438 |
| D402,887 | S | | 12/1998 | Hurst | D9/438 |
| D406,236 | S | | 3/1999 | Brifcani et al. | D9/438 |

(Continued)

FOREIGN PATENT DOCUMENTS

DE 2 553 835 6/1976

(Continued)

OTHER PUBLICATIONS

Plaintiffs' Responses and Response to Objections to Defendants' First Set of Interrogatories; Civil Action No. 03-C-0137-S; Interrogatory No. 2; pp. 1, 9, 10, and 11. (pp. 1 and 11 are redacted); dated Jun. 16, 2003.

Opinion of the United States District Court for the Western District of Wisconsin in *Anheuser-Busch Companies, Inc.* v. *Crown, Cork & Seal Co., Inc.;* Case No. 03-C-137-S; dated Nov. 20, 2003, 35 pages.

*Primary Examiner* — Dominic Simone
(74) *Attorney, Agent, or Firm* — Woodcock Washburn LLP

(57) CLAIM

The ornamental design for a can end, as shown.

DESCRIPTION

FIG. 1 is a top perspective view of a can end showing my new design;
FIG. 2 is a top view thereof;
FIG. 3 is a side elevational view thereof; the other side being a mirror image thereof; and,
FIG. 4 is a bottom plan view thereof.
The dashed lines are shown in the views for illustrative or disclosure purposes only, and form no part of the claimed design.

1 Claim, 2 Drawing Sheets

Matter enclosed in heavy brackets [ ] appears in the original patent, but forms no part of this reissue; matter printed in italics indicates the additions made by reissue.

(AMENDED)

U.S. PATENT DOCUMENTS

| | | | | | |
|---|---|---|---|---|---|
| 5,875,911 | A | | 3/1999 | McEldowney | 220/269 |
| D410,844 | S | | 6/1999 | Hurst | D9/438 |
| D411,107 | S | * | 6/1999 | Turner et al. | D9/438 |
| D415,026 | S | | 10/1999 | Turner et al. | D9/438 |
| 5,964,366 | A | * | 10/1999 | Hurst et al. | 220/269 |
| 6,024,239 | A | | 2/2000 | Turner et al. | 220/269 |
| D424,438 | S | | 5/2000 | Tuner et al. | D9/438 |
| 6,065,634 | A | | 5/2000 | Brifcani et al. | 220/619 |
| D434,983 | S | | 12/2000 | Hurst | D9/438 |
| D448,666 | S | * | 10/2001 | Fields | D9/438 |
| 6,330,954 | B1 | | 12/2001 | Turner et al. | 220/269 |
| D476,889 | S | * | 7/2003 | Fields | D9/438 |
| D507,485 | S | | 7/2005 | Fields | D9/438 |

FOREIGN PATENT DOCUMENTS

| | | |
|---|---|---|
| EP | 432 659 | 6/1991 |
| JP | 57-117323 | 7/1982 |
| WO | WO 96/37414 | 11/1996 |
| WO | WO 97/29960 | 8/1997 |
| WO | WO 97/30902 | 8/1997 |

* cited by examiner

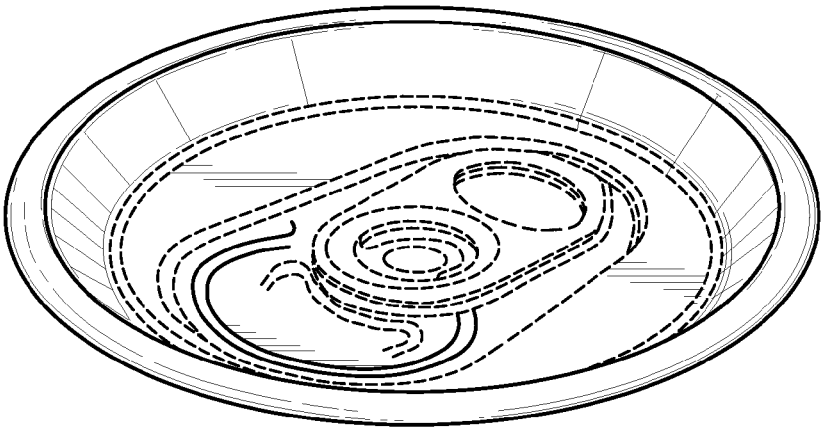
FIG. 1
(AMENDED)
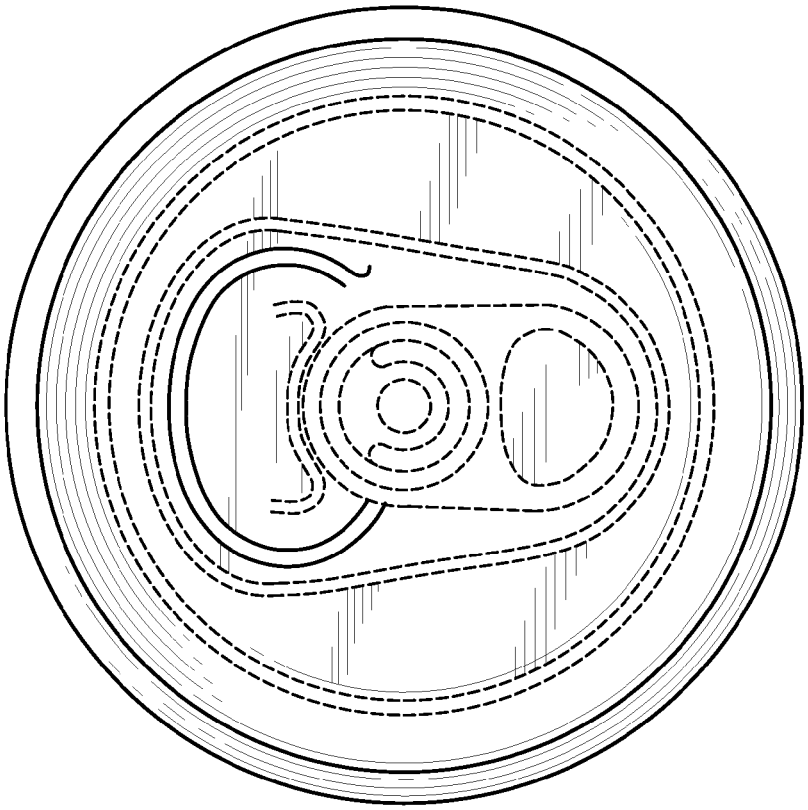
FIG. 2
(AMENDED)

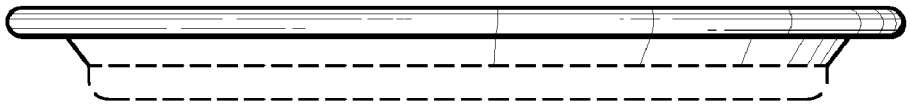
FIG. 3
(AMENDED)
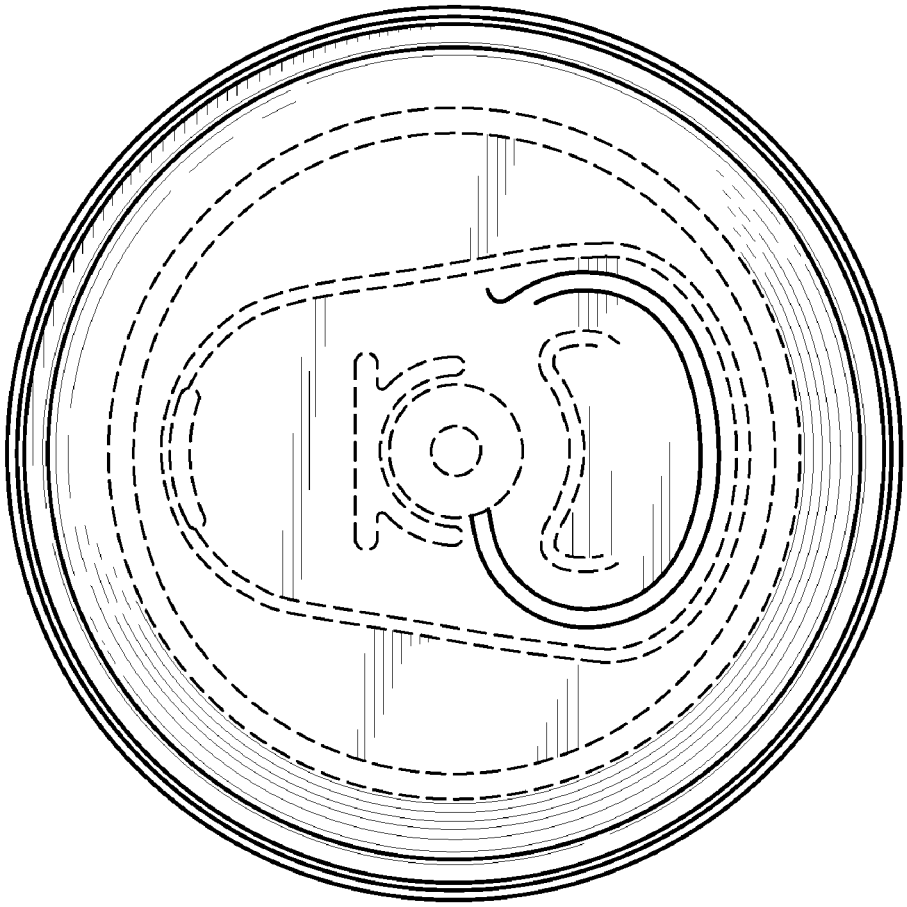
FIG. 4
(AMENDED)